United States Patent
Weiss et al.

(10) Patent No.: US 6,207,100 B1
(45) Date of Patent: *Mar. 27, 2001

(54) CLOSURE INDICATOR FOR CUP LID

(75) Inventors: David Weiss; Ronald I. Kall, both of Plantation, FL (US)

(73) Assignee: Design Safety Corporation, Plantation, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/500,457

(22) Filed: Feb. 9, 2000

Related U.S. Application Data

(63) Continuation-in-part of application No. 09/337,033, filed on Jun. 28, 1999.

(51) Int. Cl.$^7$ .................................................. B29C 43/02
(52) U.S. Cl. .............................. 264/553; 53/296; 53/487; 220/366.1; 220/713; 220/785; 220/799; 229/404; 493/343
(58) Field of Search ............................ 264/553; 493/108, 493/297, 343; 53/290, 296, 487, 489; 220/711–715, 366.1, 780, 781, 792, 796, 799, 800–802, 784–786; 215/274, 275, 320, 325; 229/404, 906.1

(56) References Cited

U.S. PATENT DOCUMENTS

| | | | | |
|---|---|---|---|---|
| 2,263,947 | * | 11/1941 | Gottfried | 220/710 |
| 3,347,409 | * | 10/1967 | Burns | 220/784 |
| 3,383,256 | * | 5/1968 | Carbone | 156/69 |

(List continued on next page.)

FOREIGN PATENT DOCUMENTS

| | | | | |
|---|---|---|---|---|
| 1113594 | * | 10/1966 | (NL) | 215/320 |
| 77716 | * | 11/1950 | (NO) | 220/666 |

Primary Examiner—Allan N. Shoap
Assistant Examiner—Joe Merek
(74) Attorney, Agent, or Firm—Nixon Peabody LLP; Donald R. Studebaker

(57) ABSTRACT

A lid for a container including a closure surface, a circumferential rim extending about a periphery of the closure surface with the rim including an outer side wall, an inner side wall and a transition wall interconnecting the outer side wall and the inner side wall with the closure surface extending from the inner side wall and at least one cut out formed in at least one of the inner side wall, the outer side wall and the transition wall such that a portion of a brim of the container is visible through the cut out when the lid is properly positioned on the container. A method and apparatus for forming such lid includes providing a substantially planar blank from which the lid is to be formed, providing at least one forming die having a surface configuration conforming to a predetermined configuration of the lid, positioning the blank adjacent the forming die, conforming the blank to the configuration of the die and forming at least one cut out section in the rim of the lid wherein at least a portion of an associated container is visible through the cut out when the lid is positioned on the associated container. The apparatus having at least one forming die having a surface configuration conforming to the configuration of the lid, forming device for conforming a blank to the surface of the forming die and a cut out forming device for forming at least one cut out in the circumferential rim of the lid in a manner such that at least a portion of an associated container is visible through the cut out when the lid is positioned on the associated container.

25 Claims, 5 Drawing Sheets

U.S. PATENT DOCUMENTS

| | | | |
|---|---|---|---|
| 3,411,660 | * 11/1968 | Lafarge | 220/800 |
| 3,532,244 | * 10/1970 | Yates, Jr. | 220/272 |
| 3,773,207 | * 11/1973 | Dokoupil et al. | 220/270 |
| 3,858,756 | * 1/1975 | Fulton | 220/374 |
| 3,868,043 | 2/1975 | Freemyer . | |
| 4,186,786 | 2/1980 | Kirkpatrick . | |
| 4,285,105 | 8/1981 | Kirkpatrick . | |
| 4,361,249 | 11/1982 | Tuneski et al. . | |
| 4,437,576 | * 3/1984 | Barniak | 220/710 |
| 4,441,623 | * 4/1984 | Antoniak | 220/711 |
| 4,502,608 | * 3/1985 | Mills | 220/712 |
| 4,629,088 | * 12/1986 | Durgin | 220/254 |
| 4,705,188 | * 11/1987 | Rahn | 220/366.1 |
| 4,767,019 | 8/1988 | Horner . | |
| 4,829,641 | 5/1989 | Williams . | |
| 4,898,298 | * 2/1990 | Norris | 220/711 |
| 4,905,861 | * 3/1990 | Boxall et al. | 220/266 |
| 4,907,321 | 3/1990 | Williams . | |
| 4,986,429 | 1/1991 | Singleton, Jr. . | |
| 5,076,425 | * 12/1991 | Plone | 206/220 |
| 5,115,929 | 5/1992 | Buono . | |
| 5,138,750 | 8/1992 | Gundlach et al. . | |
| 5,197,616 | 3/1993 | Buono . | |
| 5,427,266 | 6/1995 | Yun . | |
| 5,520,301 | * 5/1996 | Sohn | 220/265 |
| 5,538,154 | * 7/1996 | Holdt | 220/277 |
| 5,798,079 | 8/1998 | Freek et al. . | |
| 5,839,581 | * 11/1998 | Vedeges | 206/459.1 |
| 5,839,592 | 11/1998 | Hayes . | |
| 5,842,486 | 12/1998 | Davis et al. . | |

* cited by examiner

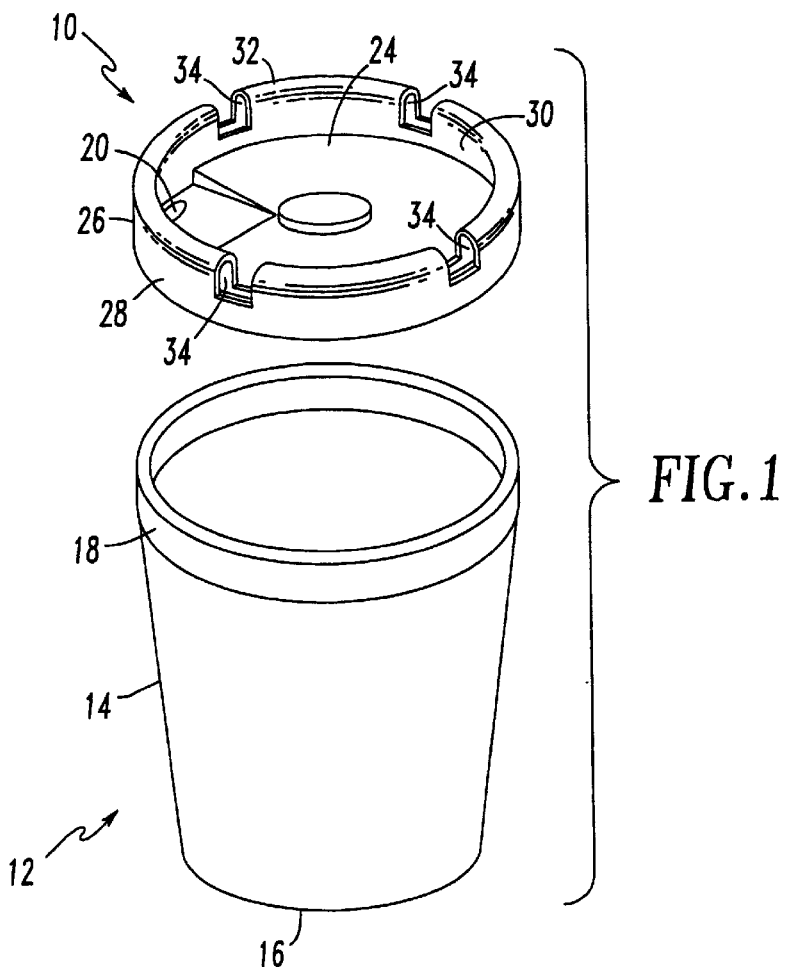
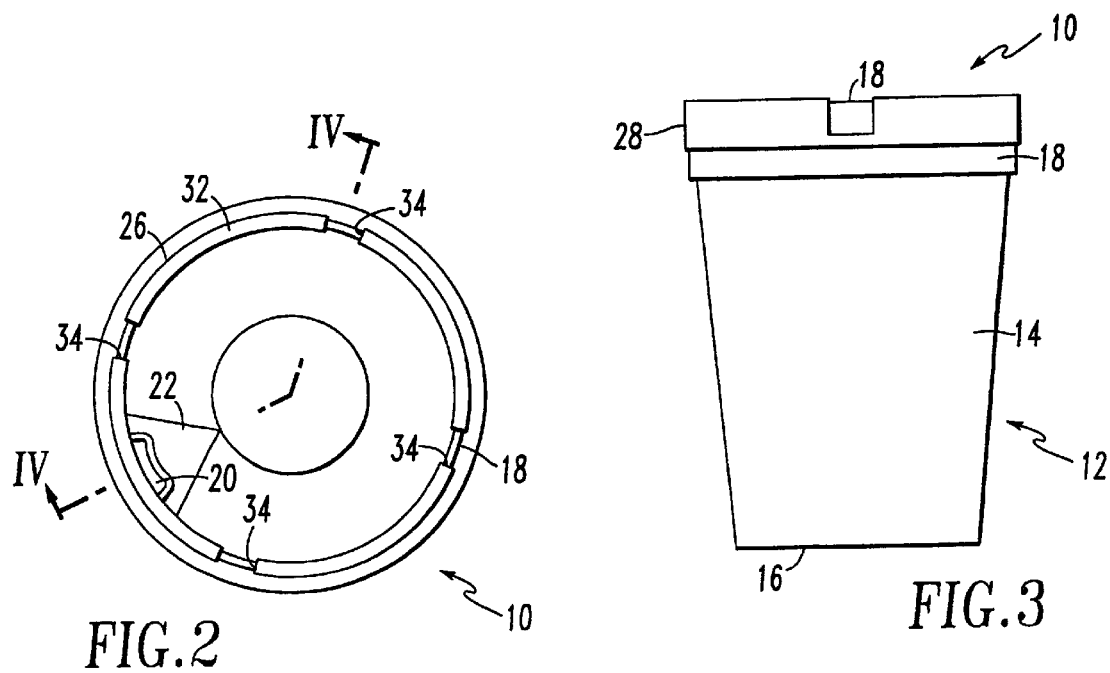

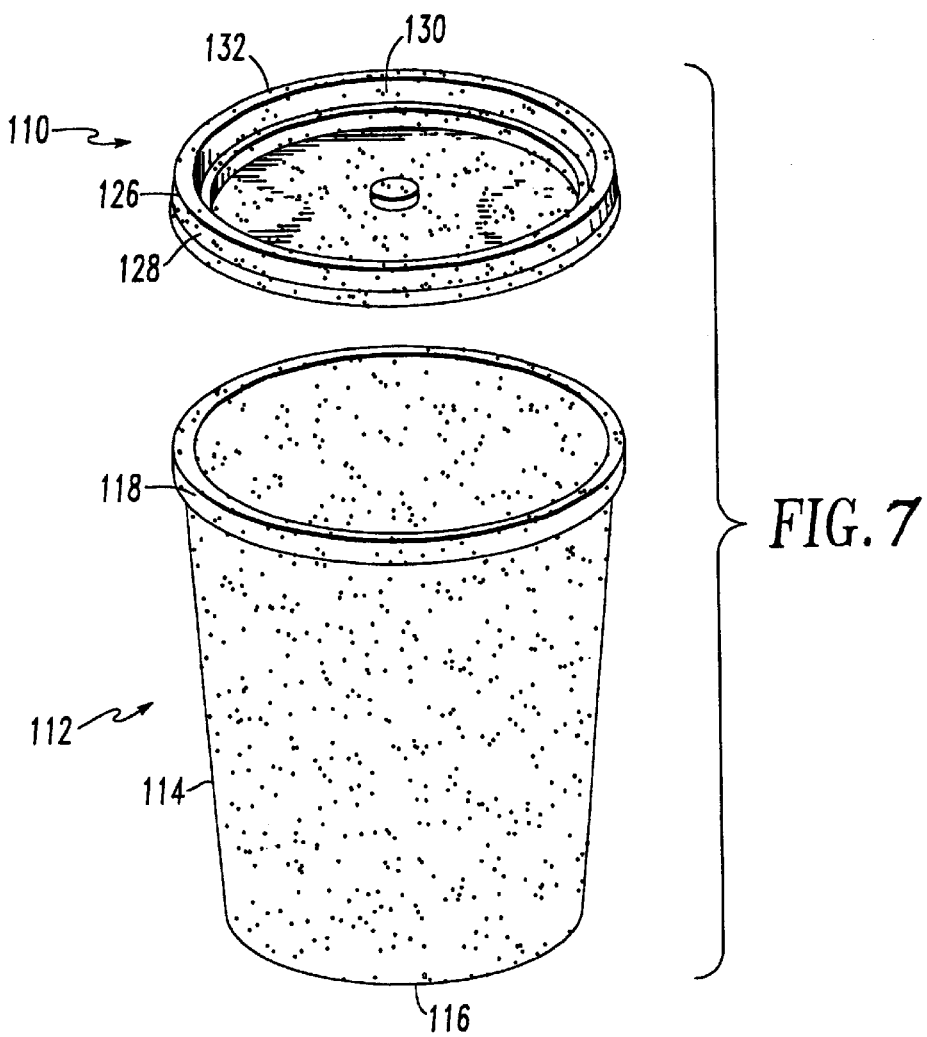
FIG. 7
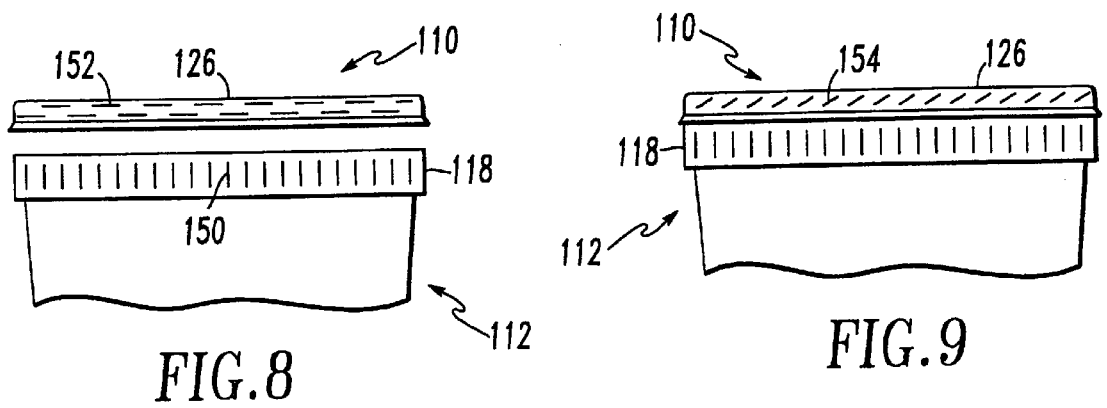
FIG. 8
FIG. 9

CLOSURE INDICATOR FOR CUP LID

This application is a Continuation-In-Part of U.S. application Ser. No. 09/337,033 filed Jun. 28, 1999.

FIELD OF THE INVENTION

The present invention is directed to a lid for a container wherein the consumer can readily observe whether the lid is properly positioned over an opening in the container. More particularly, the present invention is directed to a disposable lid for a drinking cup including a closure indication mechanism for indicating to the consumer that the lid has been properly positioned over the opening in the container to properly seal the contents therein.

BACKGROUND OF THE INVENTION

Presently, numerous configurations exist in the prior art for sealing an opening of a container. Particularly, numerous designs for disposable lids for drinking containers are set forth throughout the prior art. In such prior art it has been readily acknowledged that there is a need to have disposable lids which resist splashing and spilling of the contents within the container.

Particularly, with the proliferation of fast food restaurants and extensive public and private transportation such as airplane and automotive travel, there is a recognized need for containers which readily transport portable beverages in a single serving size and which are disposable and spill resistant. Spills and splashes caused by beverages sloshing as resulting from the normal jostling associated with drinking beverages being transported are of a particular annoyance and pose a potential for serious injury. Moreover, with pressure being applied to the sides of the container, a container lid may become dislodged resulting in spillage of the contents on an unsuspecting consumer.

Problems associated with cup lids for hot beverages are often distinct from those associated with cold beverages. That is, should a cold beverage spill on a consumer, it is merely an annoying inconvenience. However, should a hot beverage spill on a consumer serious injury such as burns associated with the hot liquid or accidents due to the diversion of the consumers attention can occur. Moreover, fast food restaurants and similar establishments which utilize such disposable containers and lids have been found to be liable for substantial damages due to injuries to the consumer. Often times, the lids are not properly positioned on the container thus subjecting an unknowing consumer to risk of the beverage spilling from the container. Otherwise, the lid becomes dislodged due to pressure being applied to the sidewalls by the consumer.

In an initial effort to provide a disposable container and lid wherein the lid restrains spilling of the containers from the container by the consumer, U.S. Pat. No. 3,868,043 issued to Freemyer sets forth a lid adapted to be snapped over a disposable cup filled with a hot beverage having a perforated drinking section along one edge. The top of the lid slops toward the drinking sections so that any liquid spilled or poured on the lid flows back into the cup. While this lid configuration acknowledges the need to restrain the contents of the container within the container and return any contents to the container which may spill from the container, this lid construction clearly fails to indicate to the consumer as to whether or not the lid is properly positioned on the container to prevent spillage of the contents from between the container and the lid. Clearly, with this lid construction, should the lid become partially dislodged from the container, contents of the container can readily spill out from between the lid and container thus injuring an unknowing consumer.

In a similar effort to restrain the contents within a container by utilizing a disposable lid, U.S. Pat. No. 4,361,249 issued to Tuneski et al. discloses a lid which includes a cover section which snap fittingly engages the top rim of the container and which has an opening there through in a bottom section which is secured to the undersigned of the cover section and has a projection that extends through that opening. This lid is essentially a two-piece lid which as is readily apparent from the disclosure, would add considerably to the costs associated with the manufacture of such container. Furthermore, this container lid suffers from the same shortcomings as discussed hereinabove. That is, while the lid configuration set forth by Tuneski et al. discloses a drinking opening which is generally in a closed position when the contents of the container are being consumed by the consumer, this reference clearly fails to disclose or suggest any mechanism for indicating to the consumer whether the lid has been properly positioned on the container. Should the lid of Tuneski et al. become dislodged due to improper positioning of the lid on the container or excessive pressure being applied to the side walls of the container by the consumer, the lid would become at least partially dislodged resulting in spillage of the contents between the container and lid itself, which as noted hereinabove could seriously injure an unknowing consumer.

As with the above-noted references, U.S. Pat. No. 4,767,019 issued to Horner discloses a splash and spill resistant cup lid having a rim structure adapted to engage a lip around the mouth of a drinking container in a substantially leak proof manner comprising a canopy extending from the rim structure forming a shallow reservoir sized to fit into the mouth of the container and a vertical opening in the canopy which deflects liquid from splashing but permits metered flow of the beverage for convenient consumption by the consumer. In positioning the lid on the container, the rim portion is manufactured at a slight angle for a press fit engagement with the interior wall of the cup thereby forming a sufficient seal between an inner sidewall of the container and the container lid. However, if this lid is not properly positioned on the container or becomes dislodged due to pressure applied by the consumer holding the container, contents can readily spill from between the lid and the container thus injuring an unsuspecting consumer. As with each of the above-noted references, there is nothing in any of the above-noted lid configurations which indicates to the consumer whether or not it has been properly positioned on the container. Further, there is nothing in the above-noted lid configurations which indicates to the consumer that the lid is in the process of becoming dislodged. Accordingly, there is clearly a need in the prior art for a simple indication mechanism which would alert the consumer as to the position of the lid with respect to the container.

In unrelated arts, the need for seal indication of a package or container has been recognized. Particularly, U.S. Pat. No. 5,427,266 issued to Yun discloses a lid which includes a seal indication window for viewing a corresponding seal indication surface on the rim of a container. This provides a quick visual indication of whether the container is closed properly. Specifically, this lid and container construction is utilized for plastic food storage containers which includes a lid that snaps or slips on to the container by applying pressure. In order to ensure freshness of the contents of the container, windows are provided about an outer periphery of the container lid which permits the consumer to visually inspect the position of the lid with respect to the container to ensure that the lid/container combination is properly closed and sealed. However, such a construction is not practical for use in disposable lid configurations. Particularly, as noted hereinabove, this lid and container construction is not for use in connection with a one time use disposable container but for a container for multiple uses. The windows provided about the outer periphery of the container are of a different material or at least different optical characteristics resulting in a variation in light transfer than that of the remaining portion of the lid structure which adds considerably to the cost of manufacturing such lids and would clearly be cost prohibitive in a disposable lid context.

Accordingly, there is clearly a need in the art for a disposable lid for a disposable drinking container wherein the lid includes a mechanism for alerting the consumer as to the positioning of the lid with respect to the container. Such an indicating mechanism would protect the consumer from inadvertent spillage of the contents of the container due to the lid not being properly positioned on the container and would limit, if not eliminate, liability on the part of the establishment which uses the consumer related products. The combination thus offers the consumer a visual means of confirming engagement where prior art mechanisms, either tactile and/or aural sound are either inconclusive or subjective and therefore may lead to failure.

SUMMARY OF THE INVENTION

A primary object of the present invention is to overcome the aforementioned shortcomings associated with the prior art lid configurations.

That is, a particular object of the present invention is to provide a cost effective mechanism for indicating to the consumer the positioning of a disposable lid with respect to a container.

A still further object of the present invention is to provide a mechanism for protecting the consumer against spillage of the contents of a container.

Yet another object of the present invention is to provide a container having an indicating mechanism which is readily viewed by the consumer at various orientations so that the consumer is offered a visual means of continuing engagement.

A still further object of the present invention is to provide an indicating mechanism about at least select portions of a periphery of the container lid in order to indicate to the consumer that all portions of the lid are properly positioned with respect to the container.

These, as well as additional objects of the present invention are achieved by providing a lid for a container including a closure surface, a circumferential rim extending about a periphery of the closure surface with the rim including an outer side wall, an inner side wall and a transition wall interconnecting the outer side wall and the inner side wall with the closure surface extending from the inner side wall and at least one cut out formed in at least one of the inner side wall, the outer side wall and the transition wall such that a portion of a brim of the container is visible through the cut out when the lid is properly positioned on the container. Alternatively, a lid and container combination can be provided with the combination including a container having a bottom wall and an upstanding side wall extending from the bottom wall, the upstanding side wall including a brim extending about an upper periphery of the side wall with at least a portion of said brim having a first color pigment and a lid formed of at least one of a transparent and translucent material, the lid including a closure surface and a rim extending about a periphery of the closure surface for engaging the brim of the container, at least a portion of the rim of the lid having a second color pigment such that when the lid and container are combined by inserting the brim of the container into the rim of the lid, the first color pigment of the container and the second color pigment of the lid combine to form a third color pigment visible from an outer surface of the rim.

The foregoing objects as well as others present invention will become apparent from the following detailed description of the present invention when read in light of the several figures.

BRIEF DESCRIPTION OF THE DRAWINGS

FIG. 1 is a perspective view of a cup or a beverage container having a cup lid in accordance with the present invention shown in a position for attachment of the lid thereto.

FIG. 2 is a plan view of the container lid illustrated in FIG. 1.

FIG. 3, is an elevational view of a beverage container having a lid positioned thereon in accordance with the present invention.

FIG. 7 is a perspective view of a cup or a beverage container having a cup lip in accordance with an alternative embodiment of the present invention positioned for attachment thereto.

FIG. 8 is an elevational view of the lid in accordance with the alternative embodiment of the present invention in position for attachment to the container.

FIG. 9 is an elevational view of a lid in accordance with the alternative embodiment of the present invention in position on the container.

DETAILED DESCRIPTION OF THE PRESENT INVENTION

Figure 4:
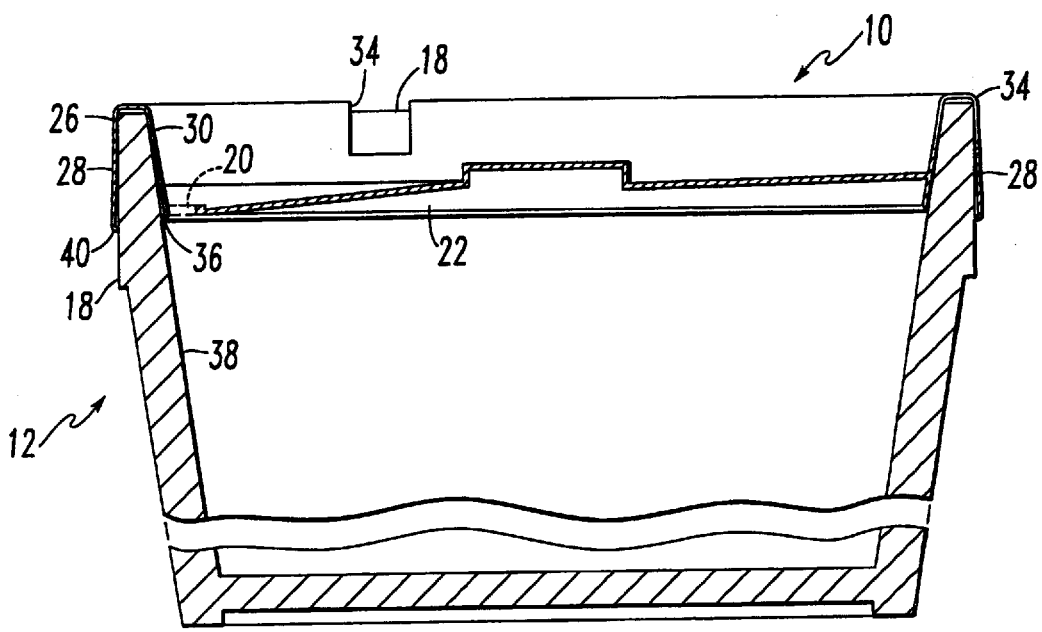
FIG. 4 is a cross-sectional view of a container lid in accordance with the present invention positioned on the container taken along lines IV—IV of FIG. 2.

With reference now to the several figures, and particularly FIGS. 1–5, an initial embodiment of the present invention will be described in detail.

Illustrated in FIG. 1 is a disposable lid 10 incorporating the details of an initial embodiment of the present invention. Such a lid is adapted to be secured about an upper periphery of a container 12 as illustrated therein. The container 12 may be of any conventional type beverage container that includes truncated side walls 14, a bottom wall 16 and a rim region 18. It is the rim region which is readily adapted to receive the disposable lid 10. It should be noted that the container 12 may take on any configuration and may be formed of any known type of material including, but not limited to, styrofoam, paperboard or a thermal settable plastic material. Particularly, the upper perimeter of the container 12 may take on numerous configurations any may include a molded brim when material such as styrofoam and thermal settable plastic material are used or a rolled brim when materials such as paperboard or a thermal settable plastic material are used. Regardless of the particular configuration of the brim region 18, the container lid 10 would be manufactured in accordance with the specifications of the brim 18 so as to form a proper seal therebetween.

As to the lid 10, this lid may take on numerous configurations and include numerous additional features without departing from the particular spirit and scope of the present invention. That is, the liquid opening 20 and overflow accumulation through 22 may take on any configuration. Moreover, the upper substantially planar surface 24 of the lid may include a domed region while coinciding with the present invention. The lid 10 includes a rim region 26 which accommodates the brim 18 of the container 12 in a conventional manner. The rim 26 includes an outer side wall 28, an inner side wall 30 as well as a transitional upper extremity 32. Mutually spaced about the rim 26 are cutouts 34. These cutouts may take on numerous configurations so long as their purpose, which will be discussed in greater detail herein below, is satisfied. Furthermore, while FIG. 1 illustrates the lid 10 as including four such cutouts, any number of cutouts may be utilized again so long as the purpose for which the cutouts are intended is satisfied.

With reference to FIG. 2, the spacial relationship of the cutouts 34 to one another is illustrated. In this regard, four cutouts are illustrated with respective pairs of the cutouts being diametrically opposed from one another. As will become apparent from further reading of the detailed description, this allows for accurate viewing of the brim 18 of the cup 12 over each quadrant of the container lid 10. As noted hereinabove, the lid 10 includes a triangular shaped drain trough which slopes downwardly toward the opening 20. As with conventional lid configurations, this trough allows any spillage or left over beverage after consumption to drain back into the container through the opening 20. Again, this particular feature of the present invention may take on numerous configurations so long as the consumer can gain read access to the contents of the container by way of a suitable opening.

With reference now to FIGS. 3 and 4, it can be seen that the lid configuration 10 forms a plug fit with respect to the brim 18 of the container. That is, the inner side walls 30 of the rim 26 of the lid 10 includes a lower most peripheral pressure point 36 wherein a liquid tight seal is formed between the lid 10 and an inner surface 38 of the container 12. The particular significance of this plug fit configuration will become apparent to those skilled in the art herein below. Additional sealing can take place between the rim 26 of the lid 10 and the brim 18 of the container 12. A peripheral pressure contact point such as the contact point 40 illustrated therein provides for the secure positioning of the lid 10 with respect to the container 12. As is clearly illustrated in FIG. 4, when the container lid is properly positioned about an upper periphery of the container 12 and secured thereto, the consumer can readily visually inspect such a position by way of the cutouts 34. That is, as is clearly illustrated in FIGS. 3 and 4, the brim 18 of the container 12 is readily visible through the cutouts 34 formed in the lid 10 thus allowing the salesperson to visually inspect the container to insure that the lid 10 is properly positioned on the container 12 and also allow the consumer to confirm that the lid has initially been properly positioned with respect to the container and also permit the consumer to be readily alerted should the lid 10 become displaced with respect to the container 12. Also, because the seal between the container 12 and lid 10 is below the cutouts, no liquid can escape through the cutouts. Clearly, this visual indicator allows for the consumer to readily inspect the container in order to ascertain whether the lid has been properly positioned with respect to the container. Furthermore, this allows the salesperson to insure that the lid is properly positioned with respect to the container prior to giving the container having potentially harmful contents therein to the consumer. Clearly, such an indication mechanism could limit the liability of the vending establishment by taking all practical measures in order to insure that the lid is properly positioned with respect to the container when the container is given to the consumer. Moreover, it provides the consumer with a mechanism to readily identify whether the lid is properly positioned and to readily identify whether the lid remains in the proper position during consumption of the contents. As noted hereinabove, regardless of the configuration of the lid, one significant aspect of the present invention is the fact that the liquid-tight seal is maintained in an area between an inner surface 38 of the container and the lid at a position between the cutout 34 formed in the lid and the contents of the container. This insures that no contents of the container will inadvertently seep out through the cutouts 34 once the lid is properly positioned with respect to the container.

Figure 5:
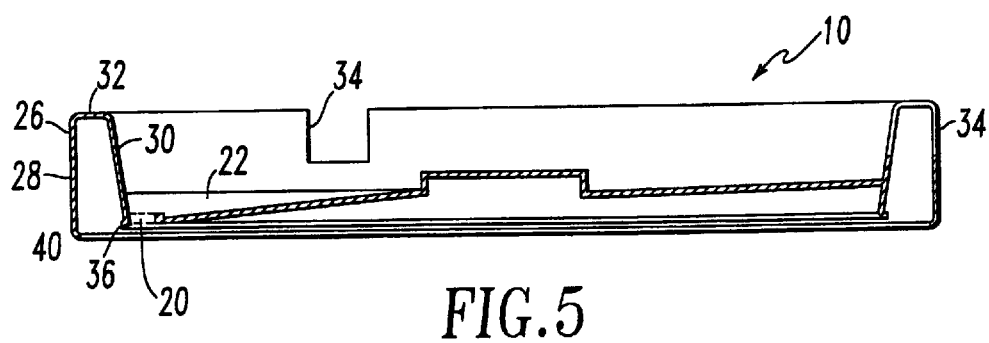
FIG. 5 is a cross-sectional view of only the lid in accordance with the present invention taken along lines IV—IV of FIG. 2.

Illustrated in FIG. 5 is a detailed cross-sectional view of the lid 10 without the presence of the container 12. As noted hereinabove, the lid 10 includes an opening 20 formed therein which may take on numerous configurations. Leading to the opening 20 is a trough region or drain region 22 which permits liquid which may splash out of the opening 20 or be left over after consumption of the contents to drain back into the container. Additionally, as noted hereinabove, the lid 10 includes a rim 26 having an outer side wall 28, an inner side wall 30 and transition region 32. Additionally, formed in the rim 26 are cutouts 34. The significance of which is set forth in detail hereinabove. Again, as noted hereinabove, any number, size and configuration of the cut outs may be included so long as the visual inspection of the lid with respect to the container is readily apparent and the overall structural integrity is maintained.

Figure 6:
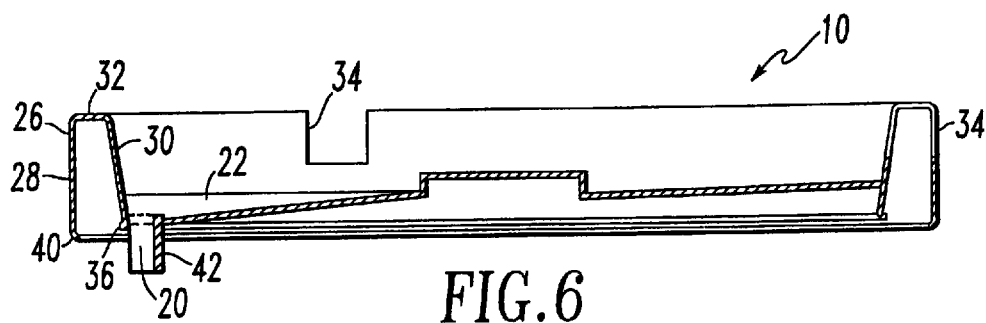
FIG. 6 is an alternative embodiment of the lid in accordance with the present invention.

FIG. 6 illustrates an alternative embodiment to that illustrated in FIG. 5 and includes all of the features noted with respect to FIG. 5. Additionally, FIG. 6 illustrates a shield 42 which holds back any non liquid contents of the container during consumption of the contents by the consumer. That is, should ice, fruit or other solid type objects be included in the contents of the container, the shield 42 will prevent such contents from clogging the opening 20 and restricting access to the contents by the consumer. Additionally, the lid configuration illustrated herein may include straw slots and any other conventionally known structural components.

With reference to FIGS. 7, 8 and 9, an alternative embodiment of the present invention will now be described in detail herein below.

As with the previous embodiments, a container 112 may take on any configuration and include any type of brim configuration 118. The container 112 includes a sidewall 114 and bottom wall 116 in addition to the brim 118.

Similar to the previous embodiment, the lid 110 may take on any known configuration. However, in this instance, the lid must be formed of a plastic translucent or transparent material. The lid may include any type of conventional opening formed therein without departing from the spirt and scope of the present invention. As illustrated in FIG. 7, the lid includes a brim 126 having an outer sidewall 128 and an inner sidewall 130 with the inner and outer sidewalls connected to one another by way of a transition region 132. Once again, the lid 110 and container 112 may take on any configuration so long as the principle set forth herein below with respect to the present invention and be sustained.

With reference now to FIGS. 8 and 9, at least the brim 118 of the container 112 is colored in a conventional manner with any one of several colors. Particularly, it is preferred that the brim 118 be colored with a primary color. Additionally, the thermal plastic lid 110 is also colored in a known manner with a color complimentary to the color of the brim 118 and preferably with a primary color complimentary to the color of the brim 118. The brim coloration is illustrated by the substantially vertical lines 150 while the lid coloration is illustrated by the substantially horizontal line2 152. It is noted that it is only essential that the rim region 126 of the lid 110 be colored, however, in order to expedite manufacture of the lids 110, the entire lid may be of an identical color. With respect to the colors chosen for each of the rim 18 and lid 110, it is preferred that the colors chosen by primary colors and that the color 150 of the brim 118 be of a darker shade than the primary color 152 of the lid 110. Again, it is essential that the lid 110 be formed by a transparent or translucent material.

With reference now specifically to FIG. 9, the lid 110 is positioned over the brim 118 of the container 112 and proper positioning of the lid 110 with respect to the container 112 results in a change in the visual color appearance of the rim region 126 of the lid 110. This change in visual coloration is illustrated by the substantially diagonal lines 154. It is noted that this concept is quite similar to that which has been used in the past for interlocking closure strips from plastic bags as illustrated in U.S. Pat. No. 4,907,321 and others. Preferably, the color combinations chosen for the present invention would be as follows.

A blue rim 118 and a yellow brim 126 resulting in a closure indication of green, a red rim 118 and a yellow brim 126 resulting in a closure indication of orange or a blue 118 rim and a red brim 126 resulting in an closure indication of purple.

Once the lid is properly positioned about an upper periphery of the container 112, the salesperson and consumer can readily visually inspect the combination so as to insure that the changed color is readily apparent about an entire periphery of the container. This occurs, when the lid 110 properly contacts the container 112.

The above-noted lid configuration and particularly the lid configuration in FIGS. 1–6 can be formed in accordance with the following methods.

As with conventional forming methods, a blank for forming the lid configuration is provided along with at least one forming die for forming the lid into the desired configuration. The particular features of the forming die will be discussed in greater detail hereinbelow with respect to the apparatus for forming such lid; however, it should be appreciated that any die configuration may be used in carrying out the present invention so long particular lid characteristics are met. Still in a conventional manner, the blank may be provided in the form of a singular circular disk prefabricated to the ending form of the lid or may be provided in the form of a substantially planar sheet which is positioned relative to a plurality of forming dies such that a plurality of lids may be formed simultaneously with one another. In doing so, the apparatus referred to hereinbelow would merely be duplicated numerous times in order to simultaneously form a plurality of lids.

The blank is positioned relative to the forming die and subsequently conformed to the die configuration. Again, this can be carried out by way of several known methods such as vacuuming forming as is discussed in greater detail hereinbelow or by press forming the blank between two cooperative male and female dies.

Prior to, during or after the conforming of the blank to the die configuration that the aforementioned cut out sections may be readily formed in the rim region of the lid. That is, as discussed hereinbelow in accordance with one embodiment of the present invention, the forming die may include ridges in the form of blades which form the requisite cut outs in mutually spaced locations about the rim of the lid simultaneously with the conforming of the blank to the die configuration. This may be also aided by the pressing of the blank into contact with the forming die. This again, will be discussed in greater detail hereinbelow.

Alternatively, the lid of any known configuration may be formed in presently conventional manners and removed from the forming die to a cutting station wherein the cut outs are subsequently formed in the rim region of the lid.

As a further alternative, a lid of any known configuration may be formed in presently conventional manners with the cut outs being formed in an area which will ultimately form the rim region of the lid prior to the formation of a lid in such a conventional manner.

Figure 10:
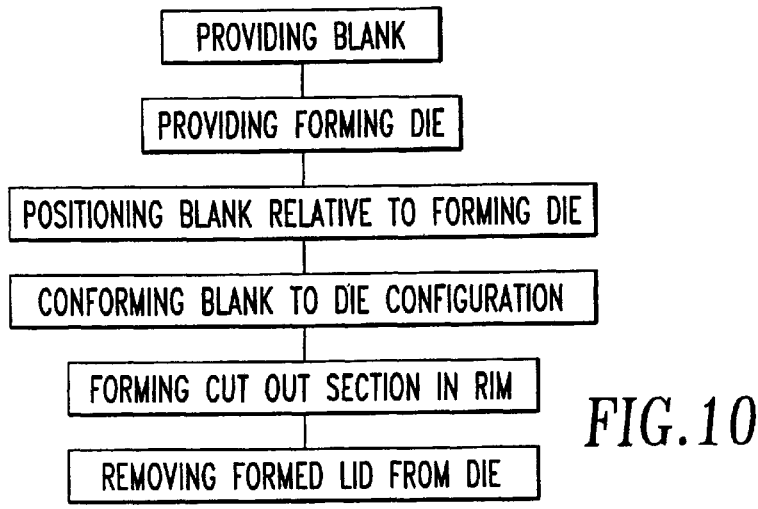
FIG. 10 is a block diagram setting forth the manipulative steps in accordance with the present invention.

As can be seen from FIG. 10 and in accordance with a preferred embodiment of the present invention, the method is initiated by providing a blank which is ultimately formed into the lids. As noted hereinabove, the blank may be in the form of a single disk for forming a single lid or in the form of a sheet wherein a plurality of lids may be simultaneously formed. The blank is positioned relative to the forming die in a known manner with the lid being subsequently conformed to the die configuration in any known manner, however, preferably as set forth hereinbelow. That is, simultaneously with the conforming of the blank to the die configuration, cut out sections are formed in the rim region of the lid. Preferably this is carried out simultaneously with the conforming of the blank to the die configuration, however, this step may be carried out subsequent to the conforming of the blank to the die configuration; however, prior to the lid being removed from the die.

Figure 11:
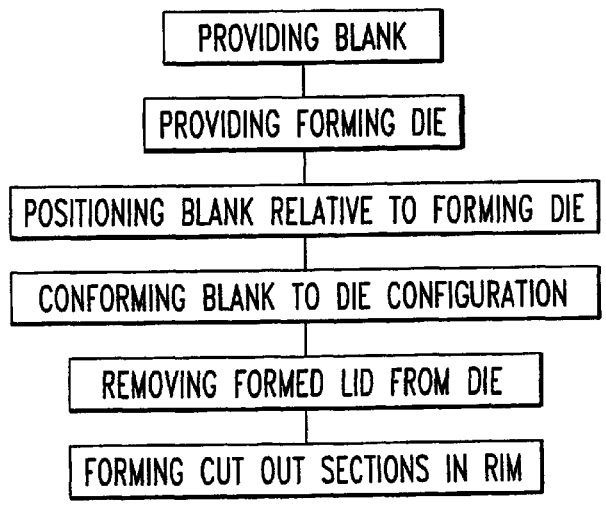
FIG. 11 is a block diagram setting forth the manipulative steps in accordance with an alternative embodiment of the present invention.

FIG. 11 illustrates an alternative embodiment of the present invention wherein the lid which is formed by the die configuration is removed from the die and subsequently transported to a cutting station wherein the cut out sections are subsequently formed in the rim region. This would be beneficial in retrofitting existing systems with a cut out section such that the die configuration need not be altered in such a presently existing system. Therein, the lid configuration can be removed from the die and transported to a subsequent station for the formation of the cut outs.

As yet another alternative, the cut out sections may be formed in the portion of the substantially planar blank where the rim region will be formed by the forming die. That is, the cut outs may be formed in predetermined areas of the blank with the blank being subsequently being formed into a lid by way of the forming die. This again would allow existing systems to be retrofitted in order to form lids having cut outs without altering the existing die configuration.

Figure 12:
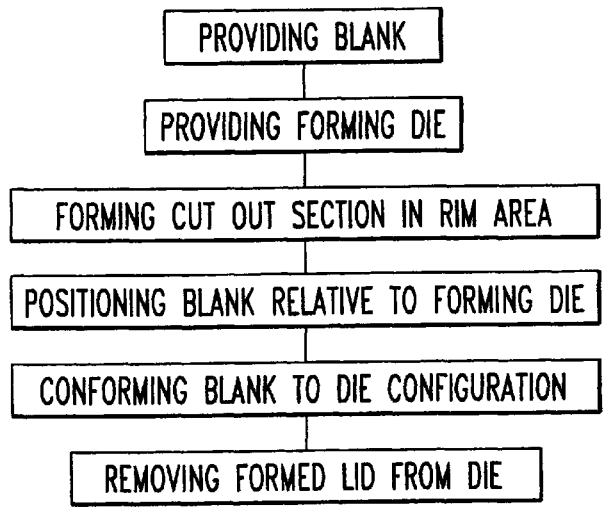
FIG. 12 is a block diagram setting forth the manipulative steps in accordance with a further alternative embodiment of the present invention.
Figure 13:
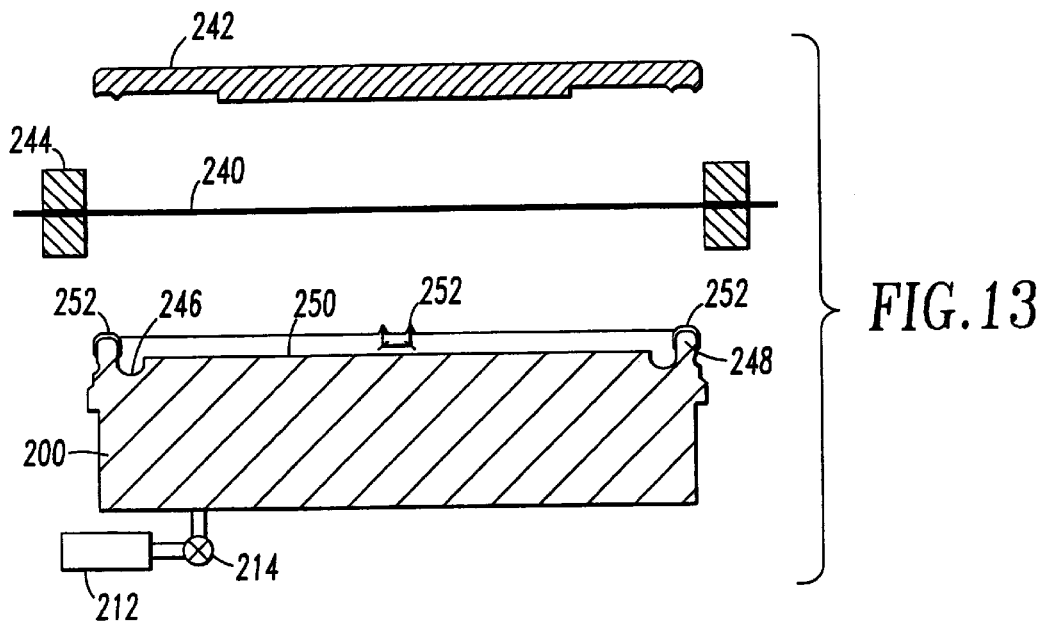
FIG. 13 is a cross-sectional view of the apparatus for forming lids in accordance with the present invention.
Figure 14:
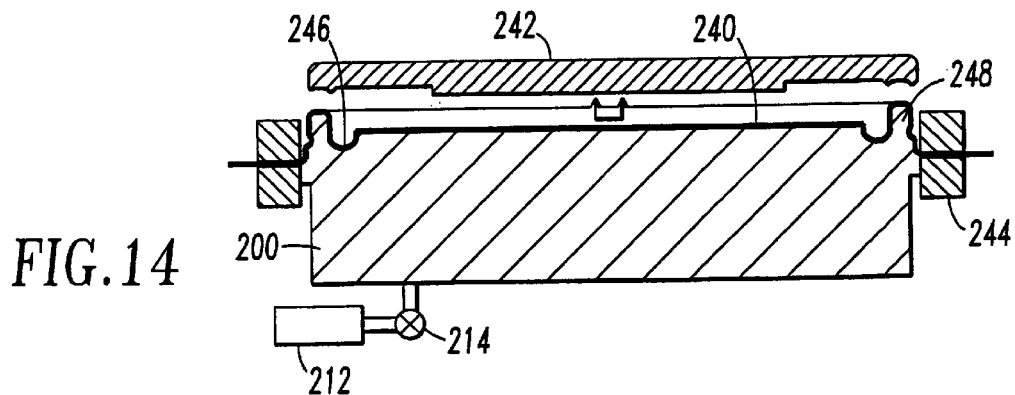
FIG. 14 is a cross-sectional view of the apparatus illustrated in FIG. 13 wherein the blank is conformed to an upper surface of the forming die.
Figure 15:
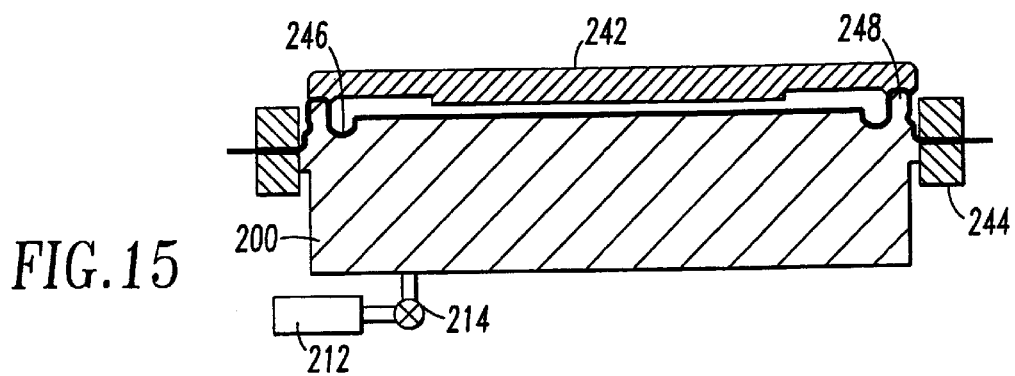
FIG. 15 is a cross-sectional view of the apparatus illustrated in FIG. 13 illustrating a pressing mechanism for ensuring formation of the cut outs in accordance with the present invention.

The method set forth in FIG. 10 may be formed in accordance with the present invention utilizing the die configuration of FIGS. 13–15. With respect to the method set forth in FIGS. 11 and 12, these methods can be carried out utilizing conventional die forming equipment with the formation of the cut outs being carried out either prior to forming of the lid configuration or subsequent to such formation.

With reference to FIGS. 13–15 and particularly, FIG. 13, a male die 200 is illustrated in its preferred position below a sheet of thermoformable material or blank 240 which ultimately forms the lid in accordance with the present invention. Also illustrated in FIG. 13 is a pressing mechanism 242 which may aid in forming the lids in accordance with the present invention.

In this regard, the thermoformable sheet material 240 is held in position above the male die 200 by way of clamps or any other suitable positioning mechanism 244. With respect to the manipulative steps discussed hereinabove as well as the further discussion hereinbelow, the movements described are relative movements with respect to the various elements and consequently, one of ordinary skill in the art would appreciate that any one or more of the components may be moved with respect to the other while maintaining one or more of such elements stationary. As can further seen from FIG. 13, the die configuration includes a trough forming region 246 and a rim forming region 248. The substantially planar portion 250 of the conforming die may take on any configuration as noted hereinabove without departing from the spirit and scope of the present invention.

Formed in the rim region 248 of the forming die 200 are cutting mechanisms 252 which form the aforementioned cut outs in the rim region of the lid substantially simultaneously with the formation of the lid configuration itself. The formation of the cut outs may be further aided by the pressing mechanism 242. In conforming the blank 240 to the die configuration 200, the blank 240 is positioned relative to the forming die 200 by clamps 244. At this point, or shortly there before, a vacuum may be drawn by way of the low pressure source 212 by way of a valve mechanism 214 in order to conform the blank of thermoformable material 240 to the die configuration 200, as illustrated in FIG. 14. In doing so, the blank of thermoformable material 240 which is heated prior to or by the die configuration 200 in order to conform to such configuration is drawn into the die configuration 200 to take on the configuration of the die. As the blank 240 is formed into the die configuration, the press mechanism 242 may be utilized in pressing the thermoformable material against the cutting mechanisms 252 in order to ensure the formation of the cut outs. This is better illustrated in FIG. 15. Subsequent to the formation of the lid, the lid is removed from the die configuration and the cut out sections removed and discarded as waste. In doing so, a lid having the characteristics of the lid configuration illustrated in FIG. 1–6 is readily formed. It is to be noted that lids formed in accordance with the present invention while being discussed as preferably applicable to beverage containers and cups, such lids may be utilized in any industry wherein it is desired to ensure that the lid is properly positioned with respect to the container by way of visual inspection of the lid subsequent to its application to the respective container.

Furthermore, while a particular apparatus is illustrated in FIGS. 13–15 for carrying out the manipulative steps of FIGS. 10–12 for forming a lid of a configuration similar to that set forth in FIGS. 1–6, it is noted that the lids may be formed in any conventional manner with the cut outs being formed by a cut out station either prior to the formation of the lid configuration or subsequent to such formation. Additionally, while FIGS. 13–15 illustrate a vacuum forming process, the lid configuration may be formed by way of a press forming configuration wherein a male and female die would cooperate in the forming the lid configuration as noted hereinabove.

Accordingly, as can be seen from the foregoing, mechanisms for insuring the proper positioning of a disposable container lid with respect to a container containing a beverage are readily achieved with no additional costs or only a minimal cost increase with respect to the lid and container, if any as can be appreciated from the foregoing discussion of the method and apparatus for forming such a lid. In accordance with the foregoing, the sales person and consumer can readily visually inspect the container in order to ascertain whether or not the lid is initially properly positioned with respect to the container. Moreover, this permits the consumer to be readily alerted should the lid become partially dislodged from the container which is not possible with the prior art. Again, such lid placement identification system can be utilized in conjunction with any industry wherein if it desired to ensure and visually inspect the positioning of a lid with respect to a container.

While the present invention has been described with reference to preferred embodiments, it should be appreciated by those skilled in the art that the invention may be practiced otherwise than as specifically described herein without departing from the spirt and scope of the invention. It is, therefore, to be understood that the spirit and scope of the invention be limited only by the appending claims.

What is claimed is:

1. A method of forming a lid having a predetermined configuration including a closure surface, a circumferential rim extending about a periphery of said closure surface, said rim including an outer side wall, an inner side wall and a transition wall interconnecting said outer side wall and said inner side wall; said method comprising providing a substantially planar blank from which the lid is to be formed;

providing at least one forming die having a surface configuration conforming to a predetermined configuration of the lid;

positioning the blank relative to the forming die;

conforming the blank to the configuration of the die;

forming at least three cut outs in the rim of said lid; and forming a drink through opening in at least a portion of said closure surface;

wherein at least a portion of an associated container is visible through said cut outs when the lid is positioned on the associated container.

2. The method as defined in claim 1, wherein said cut outs are mutually spaced about said circumferential rim of the lid.

3. The method as defined in claim 1, wherein the step of forming at least three cut outs in said lid includes forming said cut outs in said inner side wall and said transitional wall of said rim.

4. The method as defined in claim 1, wherein the step of forming said at least three cut outs in said lid includes forming said cut outs said outer side wall and said transitional wall of said rim of the lid.

5. The method as defined in claim 1, wherein the step on forming said at least three cut outs in said lid includes forming said cut outs in said outer side wall, said transitional wall and said inner side wall of said rim of the lid.

6. The method as defined in claim 5, wherein said cut outs are mutually spaced about said circumferential rim of the lid.

7. The method as defined in claim 6, wherein two diametrically opposed pairs of cut outs are formed in said circumferential rim of the lid.

8. The method as defined in claim 1, further comprising the step of forming a sealing region in said lid such that a seal between the lid and the container is created between said inner side wall of the lid and the brim of the container.

9. The method as defined in claim 8, wherein said seal is created in a region of said inner side wall between said cut outs and the contents of the container.

10. The method as defined in claim 1, wherein the step of forming said cut outs in the rim of said lid is carried out substantially simultaneously with the conforming of the blank to the configuration to the die.

11. The method as defined in claim 1, wherein the step of forming said cut outs in the rim of said lid is carried out subsequent to with the conforming of the blank to the configuration to the die.

12. The method as defined in claim 1, wherein the step of forming said cut outs in the rim of said lid is carried out prior to with the conforming of the blank to the configuration to the die.

13. An apparatus of forming a lid having a predetermined configuration including a closure surface, a circumferential rim extending about a periphery of said closure surface, said rim including an outer side wall, an inner side wall and a transition wall interconnecting said outer side wall and said inner side wall; comprising:

at least one forming die having a surface configuration conforming to the predetermined configuration of the lid;

forming means for conforming a blank to the surface of said forming die;

a cut out forming means for forming at least three cut outs in the circumferential rim; and an opening forming means for forming a drink through opening in at least a portion of said closure surface;

wherein at least a portion of an associated container is visible through said cut outs when the lid is positioned on the associated container.

14. The apparatus as defined in claim 13, wherein said cut outs are mutually spaced about said circumferential rim of the lid.

15. The apparatus as defined in claim 13, wherein said cut out forming means forms said cut outs in said inner side wall and said transitional wall of said rim.

16. The apparatus as defined in claim 14, wherein said cut out forming means forms said cut outs in said outer side wall and said transitional wall of said rim of the lid.

17. The apparatus as defined in claim 13, wherein said cut out forming means forms said cut outs in said outer side wall, said transitional wall and said inner side wall of said rim of the lid.

18. The apparatus as defined in claim 17, wherein said cut outs are mutually spaced about said circumferential rim of the lid.

19. The apparatus as defined in claim 18, wherein said cut out forming means forms two diametrically opposed pairs of cut outs in said circumferential rim of the lid.

20. The apparatus as defined in claim 13, further comprising sealing region forming means for forming a sealing region in said lid such that a seal between the lid and the container is created between said inner side wall of the lid and the brim of the container.

21. The apparatus as defined in claim 20, wherein said sealing region forming means forms said seal region between said cut outs and the contents of the container.

22. The apparatus as defined in claim 13, wherein said cut out forming means extends from said surface of said forming die.

23. The apparatus as defined in claim 22, wherein said cut out forming means forms said cut outs in the circumferential rim substantially simultaneously with the conforming of the blank to the surface of said forming die by said forming means.

24. The apparatus as defined in claim 13, wherein said cut out forming means forms said cut outs in the circumferential rim subsequent to the conforming of the blank to the surface of said forming die by said forming means.

25. The apparatus as defined in claim 23, wherein said cut out forming means forms said cut outs in the circumferential rim prior to the conforming of the blank to the surface of said forming die by said forming means.

\* \* \* \* \*